(12) United States Patent
Pirri et al.

(10) Patent No.: US 8,925,310 B2
(45) Date of Patent: Jan. 6, 2015

(54) DEVICE TO ACTIVELY CONTROL THE VIBRATIONS OF AN ARTICULATED ARM TO PUMP CONCRETE

(75) Inventors: Nicola Pirri, Milan (IT); Gennaro Paolo Bottino, Milan (IT)

(73) Assignee: CIFA SpA, Senago (MI) (IT)

( * ) Notice: Subject to any disclaimer, the term of this patent is extended or adjusted under 35 U.S.C. 154(b) by 1018 days.

(21) Appl. No.: 13/013,238

(22) Filed: Jan. 25, 2011

(65) Prior Publication Data

US 2011/0179783 A1 Jul. 28, 2011

(30) Foreign Application Priority Data

Jan. 26, 2010 (IT) .............................. UD2010A0012

(51) Int. Cl.
| | | |
|---|---|---|
| F16D 31/02 | (2006.01) | |
| E02F 9/22 | (2006.01) | |
| B66C 13/06 | (2006.01) | |
| B66F 9/22 | (2006.01) | |
| E04G 21/04 | (2006.01) | |

(52) U.S. Cl.
CPC .............. *E02F 9/2207* (2013.01); *B66C 13/066* (2013.01); *B66F 9/22* (2013.01); *E02F 9/2296* (2013.01); *E04G 21/0418* (2013.01)
USPC .............................................. 60/469; 60/426

(58) Field of Classification Search
USPC ................................ 60/421, 426, 469; 91/361
See application file for complete search history.

(56) References Cited

U.S. PATENT DOCUMENTS

| | | | | |
|---|---|---|---|---|
| 4,896,582 A * | 1/1990 | Tordenmalm et al. | .......... | 91/361 |
| 5,245,826 A * | 9/1993 | Roth et al. | ...................... | 60/426 |
| 5,784,944 A * | 7/1998 | Tozawa et al. | .................. | 91/361 |
| 5,832,730 A * | 11/1998 | Mizui | .............................. | 60/469 |
| 6,883,532 B2 * | 4/2005 | Rau | ................................. | 91/361 |
| 7,143,682 B2 * | 12/2006 | Nissing et al. | .................. | 91/361 |
| 7,278,262 B2 * | 10/2007 | Moon | ............................. | 60/469 |
| 7,729,832 B2 * | 6/2010 | Benckert et al. | ................ | 701/49 |
| 8,037,682 B2 * | 10/2011 | Yi et al. | .......................... | 60/469 |
| 8,082,083 B2 * | 12/2011 | Pirri et al. | ....................... | 701/50 |

FOREIGN PATENT DOCUMENTS

| | | |
|---|---|---|
| EP | 1 798 346 A2 | 6/2007 |
| EP | 2 067 911 A1 | 6/2009 |
| EP | 2 103 760 A2 | 9/2009 |
| JP | 2-057703 A | 2/1990 |
| JP | 05-230999 A | 9/1993 |
| JP | 11-101202 A | 4/1999 |
| JP | 11-158939 A | 6/1999 |
| JP | 2003-184133 A | 7/2003 |
| WO | 02/055813 A1 | 7/2002 |

OTHER PUBLICATIONS

Italian Search Report issued on Sep. 17, 2010 in Italian Application No. UD20100012.

* cited by examiner

*Primary Examiner* — Michael Leslie
(74) *Attorney, Agent, or Firm* — Panitch Schwarze Belisario & Nadel LLP

(57) ABSTRACT

The device to actively control the vibrations of an articulated arm consisting of a plurality of segments each comprising at least its own actuator associated with a hydraulic drive circuit including a block valve. At least one of said actuators is associated with an hydraulic control circuit of the vibrations, comprising at least a sensor able to detect the vibrations and/or the position of one or more segments, a processing unit to process the signals of the sensor/sensors and a pump commanded by the electronic command board and cooperating with said block valve. The hydraulic control circuit is associated with the hydraulic drive circuit.

5 Claims, 3 Drawing Sheets

DEVICE TO ACTIVELY CONTROL THE VIBRATIONS OF AN ARTICULATED ARM TO PUMP CONCRETE

FIELD OF THE INVENTION

The present invention concerns a device to actively control the vibrations of an articulated arm to pump concrete.

In particular, the invention concerns an active control device used to reduce the vibrations to which the various segments of an articulated arm used to pump concrete in operating machines are subjected, machines such as truck-transported pumps, pumps on concrete mixers with pumps or suchlike, whether these are assembled on wagons or trucks or not.

BACKGROUND OF THE INVENTION

Heavy work vehicles are known, used in the building trade, normally consisting of a truck on which an extendable and/or telescopically extending arm is assembled, articulated for dispensing and casting concrete. The trucks may or may not be equipped with a concrete mixer.

Extendable arms of the known type consist of a plurality of segments hinged to each other and which can be folded back one on the other, so as to be able to assume a folded configuration close to the truck, and work configurations which can reach areas which are even very far from the truck.

One of the most important features of these extendable arms is the capacity to reach the greatest heights and/or lengths possible, so as to be able to guarantee maximum flexibility and versatility with the same truck.

An increase in the number of articulated segments, or an extension of the length of each of them, on the one hand allows to obtain greater overall lengths when at maximum extension but on the other hand causes an increase in weight and bulk which is not compatible either with current legislation or the effectiveness and functionality of the vehicle.

It is also known that a shortcoming which is often complained about with regard to the correct effectiveness of these arms is the phenomenon of vibrations to which the arm is subjected while it is delivering concrete: the greater the overall length of the arm and the number of segments, the more this problem is felt. These vibrations cause considerable operating difficulties both for the operator who is responsible for the manual positioning and orientation of the exit tube of the concrete, and also for the operator moving the arm by remote control.

An important component of these vibrations also derives from the type of the machines and from their relative characteristics of slenderness, inertia and elasticity, as well as the constructive type. In fact, these characteristics induce dynamic stresses in the articulated arm, which are associated both with the modes of the machine itself, in a substantially static condition, or at least not pumping, and also with the dynamic loads associated with the concrete pumping step.

Indeed, in order to be used, the machine works by moving from one configuration of the arm to another: this implies that its own mode is continuously excited and dynamic variations are generated on the state of stress of the joints and in the material, which limits the working life of the machine and reduces safety for the workers.

Furthermore, to these effects are also added the forced and pulsed functioning associated with the piston pump used for pumping the concrete, which often happens at frequencies close to those of the machine itself.

A method to actively control the vibrations of an articulated arm for pumping concrete is described in EP 2103760 in the name of the present Applicant, which describes a method to contain the first vibration modes of the articulated arm, which are those that most determine the dynamic load and hence the onset of vibrations.

Documents JP 2057703 and JP 11101202 are known, that disclose controlling devices for hydraulic cylinders having actuators, which devices comprises sensors to detect the travel of the actuators, and a control unit to receive information from the sensors and to control the hydraulic pumping device of the hydraulic drive circuit at which the actuators are connected.

In particular, document JP 2057703 allows to reduce the shock, and so the vibrations, due to the stroke end of a hydraulic cylinder, reducing the speed at which the hydraulic cylinder expands/contracts when the cylinder is near the stroke end.

However, these devices have the drawback that they do not allow an active control of the vibrations but allow only to reduce the onset.

Moreover, they are concerned only with a factor that could generate the vibration of one segment of the arm, and not to the general problem of avoiding the presence of vibrations along the whole arm.

Purpose of the present invention is therefore to supply a device to actively control the vibrations of an articulated arm, which allows to correct and compensate the vibrations of the articulated arm.

The Applicant has devised, tested and embodied the present invention to obtain this purpose, and other advantages explained hereafter.

SUMMARY OF THE INVENTION

The present invention is set forth and characterized in the independent claim, while the dependent claims describe other characteristics of the invention or variants to the main inventive idea.

In accordance with the above purpose, a device is presented for the active control of the vibrations of an articulated arm, consisting of a plurality of segments, which is applied in operating machines such as truck-transported pumps, concrete mixers or suchlike, for pumping concrete.

Each segment comprises at least its own actuator associated with a hydraulic drive circuit including a block valve, which allows to keep the segment in position once positioned.

According to one feature of the invention, at least one of the actuators is associated not only with the main hydraulic drive circuit, but also with an auxiliary hydraulic control circuit to control the vibrations, which comprises at least a sensor able to detect the vibrations, that is, to detect the actual position, and thus the possible variation, due to the presence of the vibrations, of the actual position from a nominal position determined by an operator, a electronic command board to process signals from the sensor/sensors, and a pump commanded by the electronic command board and cooperating with the block valve.

In one embodiment of the invention, the at least one sensor can detect the position of a segment which is different to the segment at which the hydraulic control circuit is associated.

The hydraulic control circuit is also associated with the hydraulic drive circuit.

In particular, the hydraulic drive circuit provides to position the articulated arm in a desired configuration, according to the commands imparted by the operator, entailing big displacements of the actuators.

The hydraulic control circuit, on the contrary, depending on the signals sent by the electronic command board, which in its turn receives signals from the relative sensors, provides to cause possible displacements/forces to the relative actuator/actuators, in order to reduce and/or eliminate the vibrations of the whole articulated arm, by introducing or drawing the working fluid that is added or subtracted to the fluid determined by the main commands set by the operator.

This correction range allows to reduce, and even eliminate, the vibrations on the whole articulated arm and, as well as improving the working conditions of the articulated arm, also extends the duration of the individual components that make up the articulated arm, limiting phenomena of fatigue and wear.

According to a variant, the hydraulic control circuit comprises at least a command portion associated with the block valve that receives commands from the electronic command board and feeds the block valve.

Advantageously, the command portion is an electro-proportional directional valve, which allows a very rapid response and solidity even in difficult working conditions.

According to another variant, the block valve comprises at least a movement portion which provides for the normal movement of the actuators and a control portion directly associated with the hydraulic control circuit.

The control portion, in particular, allows to make corrections to the positioning of the articulated arm by pumping the working fluid so as to modify, at least slightly, the configuration of the articulated arm, with respect to the commands sent by the operator, in order to reduce or eliminate the vibrations of the relative segments.

Another variant of the invention provides that the control portion of the block valve also comprises a safety portion which, in the event of a breakdown of the hydraulic control circuit, blocks the articulated arm in the position where it is, and prevents further damage.

According to another possible form of embodiment, the pump is the type with a fixed cubic centimeter volume, to maintain an almost constant pressure inside the control circuit.

According to another variant, the pump is the type with a variable cubic centimeter volume, and allows to obtain a great reduction in the power dissipated.

The pump, according to a possible variant, comprises an electro-proportional regulator commanded by the electronic command board, which varies the cubic centimeter volume of the system and reduces the power dissipation of the pump.

According to a variant, the sensors are accelerometers, extensometers, inclinometers, travel meters of the actuators, pressure transducers or other similar or comparable element which allows to detect the vibrations and/or positioning of the actuators of the individual segments that make up the articulated arm.

BRIEF DESCRIPTION OF THE DRAWINGS

These and other characteristics of the present invention will become apparent from the following description of a preferential form of embodiment, given as a non-restrictive example with reference to the attached drawings wherein.

Figure 1:
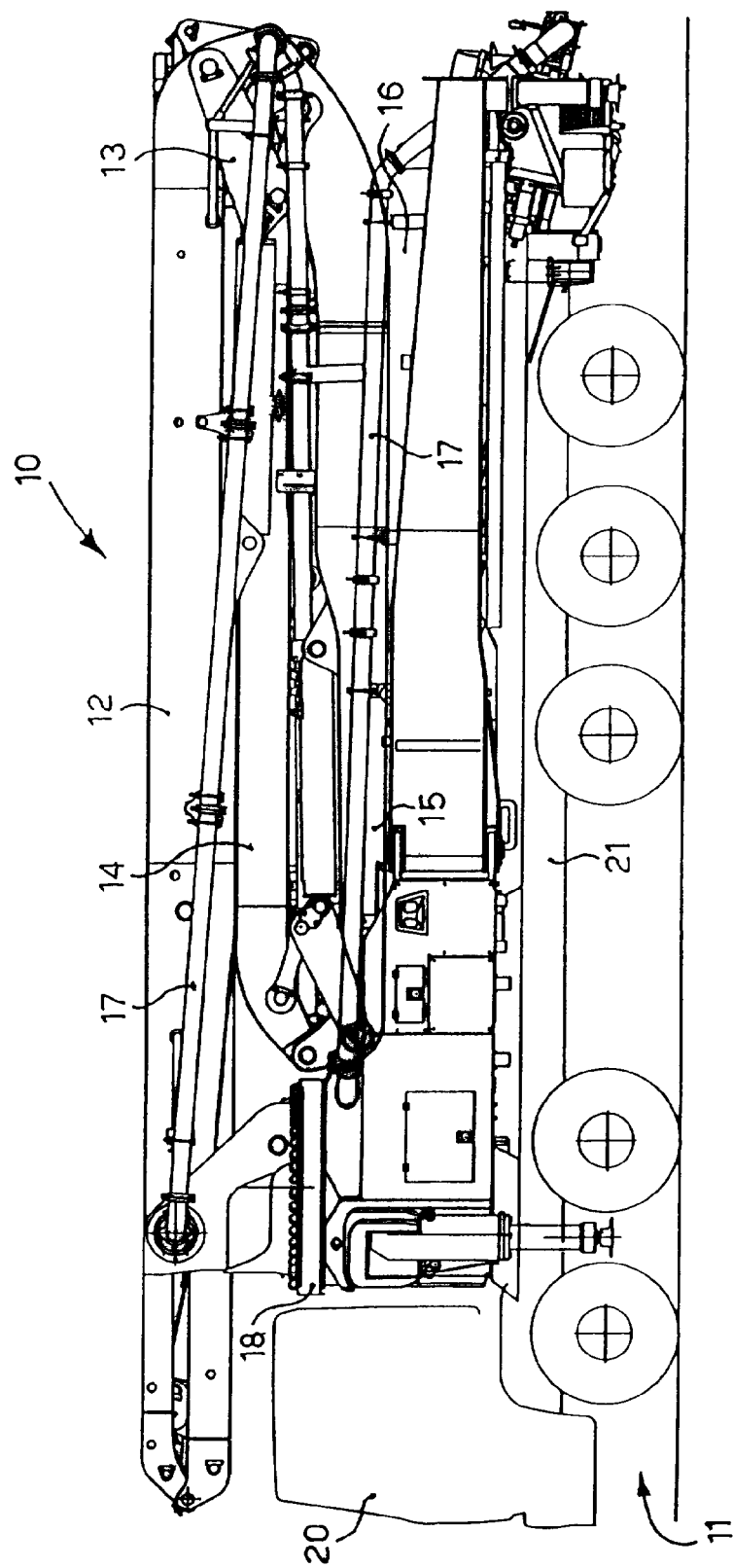
FIG. 1 shows schematically an operating machine with an articulated arm for dispensing concrete in which the control device according to the present invention is applied.

To facilitate comprehension, the same reference numbers have been used, where possible, to identify common elements in the drawings that are substantially identical. It is understood that elements and characteristics of one form of embodiment can conveniently be incorporated into other forms of embodiment without further clarifications.

DETAILED DESCRIPTION OF A PREFERENTIAL FORM OF EMBODIMENT

With reference to FIG. 1, an extendible articulated arm 10 according to the present invention, able to dispense concrete or similar material for the building trade, is shown in its position mounted on a heavy work vehicle 11, in its folded transport condition.

The heavy work vehicle 11 comprises a driver's cab 20 and a support frame 21 on which the articulated arm 10 is mounted.

The articulated arm 10 according to the present invention comprises a plurality of articulated segments, for example, in the solution shown, six in number, respectively a first 12, a second 13, a third 14, a fourth 15, a fifth 16 and a sixth 17, pivoted to each other at the respective ends. In a known manner, and with systems not shown here, the whole group of articulated segments 12-17 can be rotated, also by 360°, with respect to the vertical axis of the vehicle 11.

The first segment, in a known manner, is pivoted to a turret 18, and can be rotated with respect to it by means of an actuator 22. The other segments 13-17 are sequentially pivoted to each other at respective ends and can be individually driven, by their own actuators 22.

The segments 12-17 (FIG. 2) are driven by a main hydraulic drive circuit 57 commanded by the operator, which comprises, pumping means 58, an oil tank 59, and a control unit 60 which is driven by the operator with driving means 61, in this case represented by a joystick. The control unit 60 is suitable to feed the actuators 22 by means of a plurality of distributing valves 62 or by means of modified block valves 30.

A hydraulic control circuit 23, associated with the hydraulic drive circuit 57, provides to deaden the vibrations of the articulated arm 10 and is driven by an electronic command board 28 that can be activated by the operator.

Figure 2:
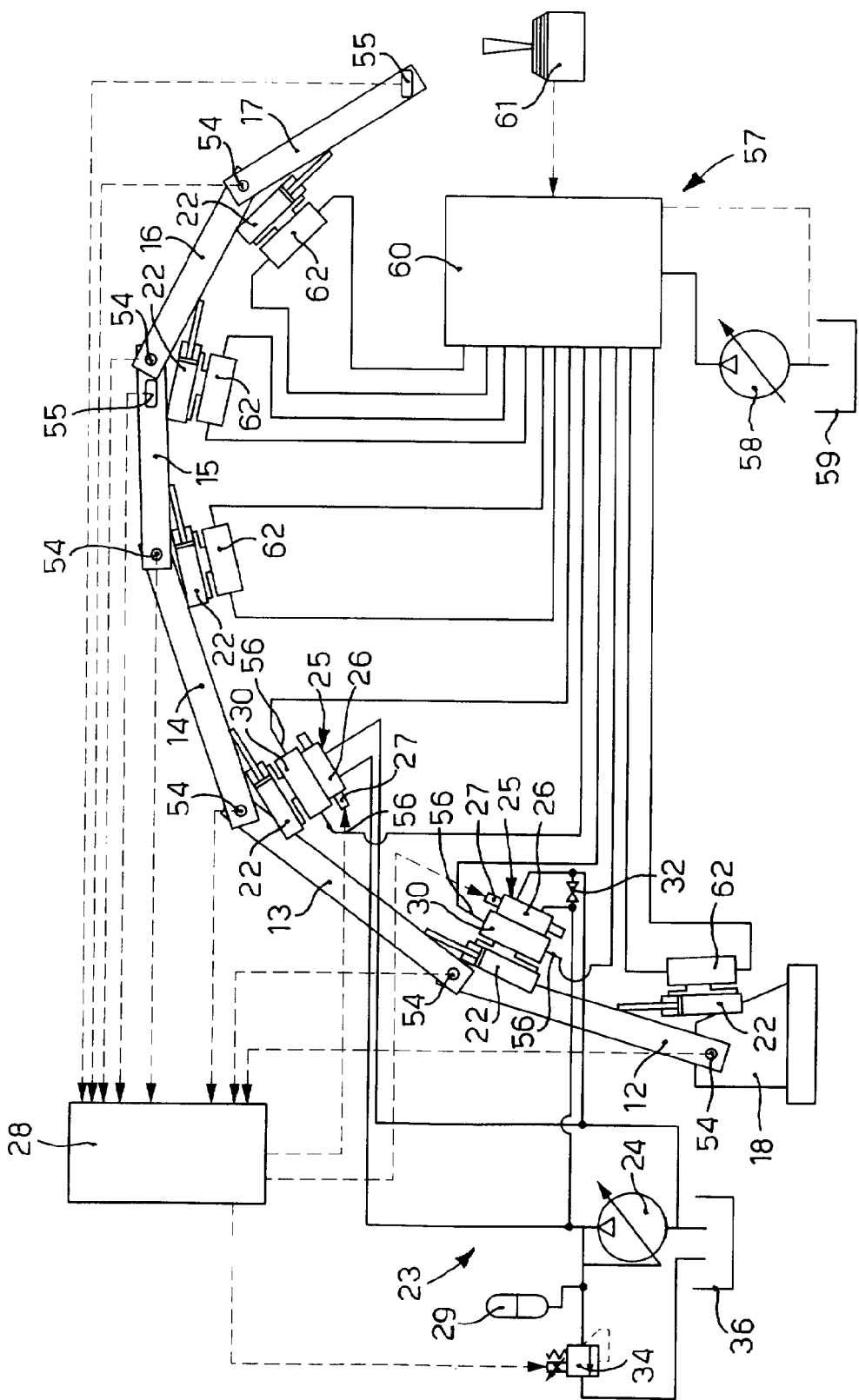
FIG. 2 is a schematic representation of the control device, according to one form of embodiment of the invention, applied to the articulated arm.

FIG. 2 shows the hydraulic control circuit 23 associated at two actuators 22 of the articulated arm 10.

It is clear that the hydraulic control circuit 23 may be associated, in other embodiments, to more than two segments 12-17, for example to all the segments 12-17 of the arm, or to only one segment 12-17 of the arm.

Figure 3:
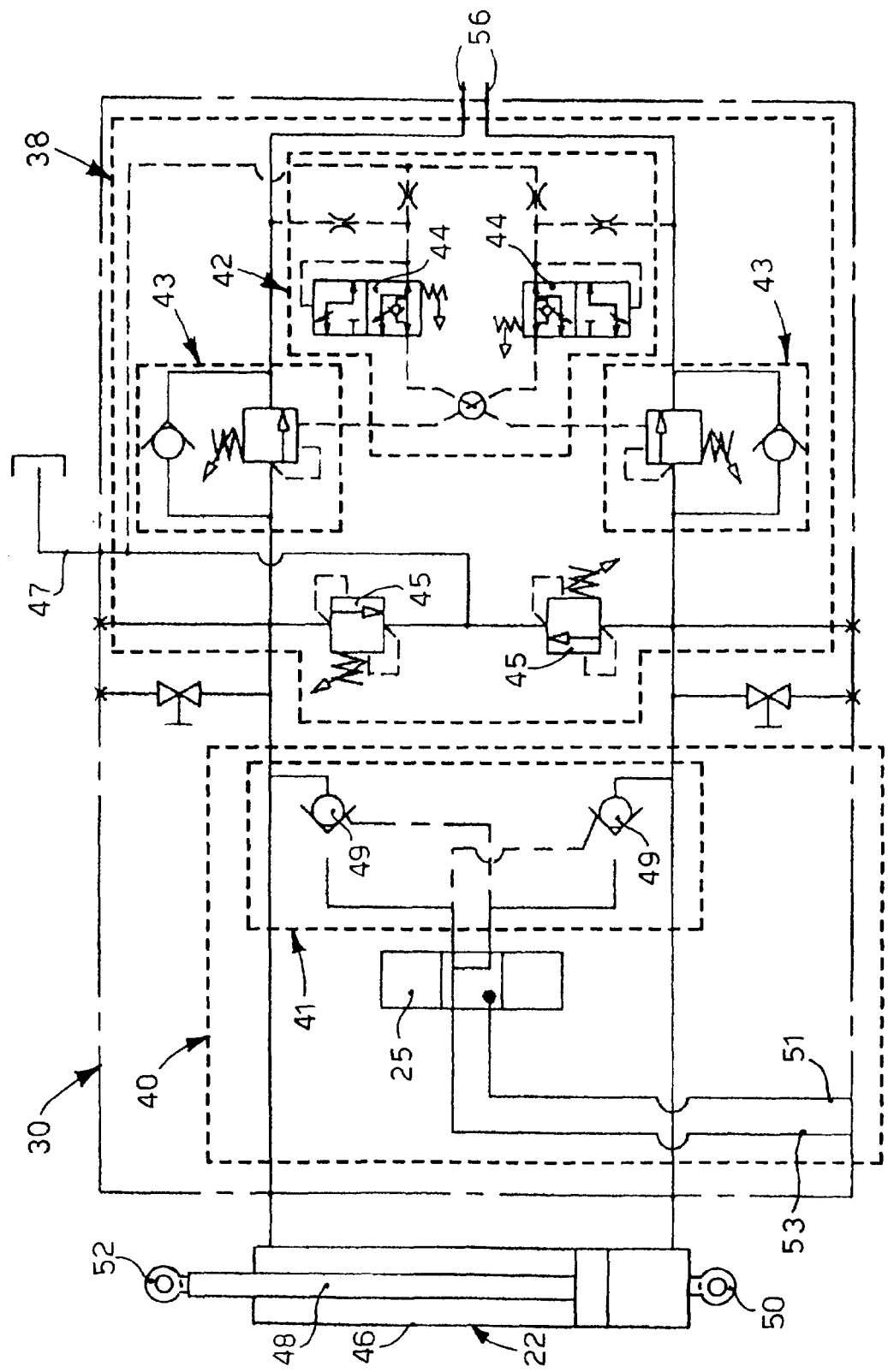
FIG. 3 is a schematic functional representation of the block valve in one form of embodiment.

In the FIGS. 2 and 3, the flows of the electric signals processed and detected by the electronic board 28 are shown by lines of dashes, while the connections of the various components of the control circuit 23 are shown by continuous lines.

The control circuit 23 comprises an oil-dynamic pump 24, electro-valves 25 commanded by the electronic board 28, the modified block valves 30, the actuators 22, an interception valve 32, an electro-proportional pressure regulator 34 and an oil tank 36.

The control circuit 23 also comprises a hydraulic accumulator 29 able to keep the control circuit 23 under pressure, in order to reduce the response times in the control steps.

Each actuator 22 (FIG. 3) is the double effect type, comprises a cylinder 46, a plunger 48, a mobile attachment mean 52 solid with the plunger 48, and a fixed attachment mean 50 solid with the cylinder 46.

The oil-dynamic pump 24 is advantageously in this case of the axial type with variable cubic centimeter volume; this allows to control and keep the working pressure in the delivery pipes always at an almost constant value and advantageously about 350 bar, reducing the power dissipated to a minimum value.

The pump 24 is advantageously different from the pump 58 normally used in the hydraulic drive circuit, because the working parameters of the pump 24 must be controlled and regulated with high precision and sensitivity.

The electro-valves 25 comprise a command portion 27 and a valve body 26.

The command portion 27 includes proportional solenoids which are excited by electric signals, preferably current signals, sent by the electronic board 28.

The entity of the signal is proportionate to the entity of the displacement of the actuator 22 which is to be obtained.

The valve body 26 in this case is of the 4-way proportional type and when switched allows the oil to pass in the block valve 30.

With reference to FIG. 3, the block valve 30 comprises a movement portion 38 and a control portion 40.

The movement portion 38 comprises gaps 56, which are connected to the hydraulic drive circuit 57, to feed and discharge the oil, a pilot portion 42, two counter-balance valves 43 and two first maximum pressure valves 45.

In this particular case, the pilot portion 42 comprises two second maximum pressure valves 44.

The control portion 40 comprises a command port 51, a discharge port 53 to feed a safety part 41 comprised in the control portion 40 and the electro-valve 25.

For the ordinary movement of the articulated arm 10, the movement portion 38 of the block valve 30 is used, feeding the gaps 56 by means of the hydraulic drive circuit 57.

By means of the pilot portion 42, the counter-balance valves 43 control the inlet and outlet of the oil inside the actuator 22. The two first maximum pressure valves 45 allow to eliminate the instantaneous pressure peaks which can arise in the event of sudden stoppages or sudden increases in pressure, discharging the oil through a discharge path 47 provided in the block valve 30.

The purpose of the second maximum pressure valves 44, comprised in the pilot portion 42, is to prevent pitching effects of the articulated arm, which phenomenon often occurs when it is retracted.

The control portion 40 allows to control the oscillations of the articulated arm, it is fed and command by the electro-valve 25, through the command port 51 from which the oil enters, and the discharge port 53 which discharges the oil.

Then the purpose of the movement portion 38 of the block valve 30 is to make the pressurized oil pass and send it to the actuator 22 in order to move it. Once the actuator 22 is in the desired position, the movement portion 38 keeps the actuator 22 in that configuration until further command are supplied to modify the position. This configuration is advantageously maintained even when the oil-dynamic circuit breaks down.

The control portion 40, by means of the electro-valve 25 and the piloted non-return valves 49 comprised in the safety part 41, allows the pressurized oil to pass, which modifies the configuration of the actuator 22, according to the indications supplied by the electronic board 28.

The control portion 40 by-passes the movement portion 38 and makes the oil pass directly into the actuator 22, feeding it through the command port 51 and discharging it from the discharge port 53. This allows a rapid response to the commands sent by the electro-valve 25, at the same time reducing the reaction times to vibratory phenomena.

The safety part 41 also enters into action during breakdowns, for example when the pressure in the control circuit 23 goes below a predetermined threshold, for example in the event that a pipe or packing breaks, or suchlike.

Sensors are attached on the articulated segments 12-17, which provide to detect the vibrations that affect that particular segment and, in cooperation with the calculation algorithm of the electronic card 28, provide to assess the force to be applied on the actuators 22 in order to modify the configuration of the whole articulated arm 10.

In particular, the sensors 54-55 allow the detection of the actual position of the articulated segments 12-17, that is, also the variation, due to the vibrations, from a nominal position in which the articulated arm is, or could be consider, fixed.

The sensors are advantageously accelerometers 55 and inclinometers 54.

The inclinometers 54 provide an indication of the inclination assumed by the various segments 12-17, and allow the determination of a modal model: these alone, however, cannot be used to determine the forces to be applied on the actuators, given their low resolution of the signal.

To this purpose, in order to determine the vibrations that arise on the articulated segments 12-17, accelerometers 55 are used.

The signals detected by the sensors 54, 55 allow to determine the position of each individual segment 12-17 and also the overall configuration of the articulated arm 10.

The configuration assumed by each individual segment 12-17 together with the relative physical characteristics allows to construct a modal model.

The modal model, together with the signals concerning the onset of vibration phenomena sent by the sensors, and in particular by the accelerometers 55, to the electronic board 28, allow to establish, through an algorithm, which interventions are to be made.

Depending on the results obtained, the electronic board 28 generates electric signals, advantageously in current, advantageously from 0 to 3 amps, which are sent to the command portions 27 of the electro-valves 25 of each individual actuator 22 and to the electro-proportional regulator 34 that intervenes on the pump 24 to pump oil in the actuators 22 and modify the configuration of the articulated arm, and so its modal model, to reduce and eliminate the vibrations.

The intensity of the electric signal is proportional to the entity of displacement to be imparted to the actuators 22, and is defined according to a law predefined by the calculation code of the electronic board 28.

When it receives the signal, every electro-valve 25 switches and makes the pressurized oil pass, conveying it into the block valve 30, more precisely through the control portion 40 that provides to send it directly into the actuator 22.

In proportion to the entity of the signal sent to the electro-valve 25, the actuator 22 will dispose itself according to the pre-established configuration.

At the same time the electronic board 28 also provides to transfer an electric signal to the electro-proportional regulator 34 which, modifying the pressure in the feed branch of the pump 24, makes its cubic centimeter volume vary in order to keep the desired pressure in the delivery branch of the control circuit 23.

If the active control circuit 23 according to the invention has been de-activated, or has not been activated by the electronic board 28, the pressure in the control circuit 23 is taken to a minimum value.

In every functioning condition, the electro-proportional regulator 34 of the pump 24 takes the volume of the pump 24 to a minimum value, to reduce the dissipation of power.

According to another form of embodiment, the possibility is provided to vary the pressure inside the control circuit 23 continuously, so as to further reduce the dissipations of energy.

It is clear that modifications and/or additions of parts may be made to the device to actively control the vibrations of an articulated arm as described heretofore, without departing from the field and scope of the present invention.

For example, it may be provided to use other sensors attached on the actuators, which are able to detect the travel meters of the actuators and/or their pressure; it is strictly necessary to detect the travel meters of the actuators 22 if the segments 12-17 that make up the articulated arm 10 are of the extendible type and for which it is therefore necessary to determine their extension.

It is also clear that, although the present invention has been described with reference to some specific examples, a person of skill in the art shall certainly be able to achieve many other equivalent forms of device to actively control the vibrations of an articulated arm, having the characteristics as set forth in the claims and hence all coming within the field of protection defined thereby.

The invention claimed is:

1. A device to actively control the vibrations of an articulated arm consisting of a plurality of segments each comprising at least its own hydraulic actuator associated with a hydraulic drive circuit including first pumping means, an oil tank, a control unit which is driven by the operator with driving means, and a block valve, wherein at least one of said actuators is associated with a hydraulic control circuit of the vibrations, comprising at least a sensor able to detect the actual position and the variation of the position from a nominal position of one or more segments, an electronic command board to process the signals of the sensor/sensors and a second pumping means associated to its own oil tank, commanded by the electronic command board and cooperating with said block valve, said hydraulic control circuit being associated with the hydraulic drive circuit and configured to be activated by the electronic command board to pump oil in the related actuator when vibrations are detected by the electronic command board.

2. The device to actively control vibrations as in claim 1, wherein said hydraulic control circuit comprises at least a command portion associated with the block valve, able to receive commands from the electronic command board and to feed said block valve.

3. The device to actively control vibrations as in claim 2, wherein the command portion is an electro-proportional directional valve.

4. The device to actively control vibrations as in claim 1, wherein the block valve comprises at least a movement portion, suitable for the normal movement of the actuators, and a control portion directly associated with the hydraulic control circuit.

5. The device to actively control vibrations as in claim 4, wherein the control portion of the block valve comprises a safety part able to enter into action in breakdown conditions of the hydraulic control circuit.

* * * * *